US007302257B2

(12) United States Patent
Taketsugu (10) Patent No.: US 7,302,257 B2
(45) Date of Patent: Nov. 27, 2007

(54) WIRELESS ACCESS CONTROL METHOD AND WIRELESS ACCESS SYSTEM

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 510 days.

(21) Appl. No.: 10/612,953

(22) Filed: Jul. 7, 2003

(65) Prior Publication Data
US 2004/0005888 A1 Jan. 8, 2004

(30) Foreign Application Priority Data
Jul. 8, 2002 (JP) ............................... 2002-198830

(51) Int. Cl.
*H04Q 7/20* (2006.01)
(52) U.S. Cl. .................... 455/422.1; 455/69; 455/41.2; 455/411; 455/414.1; 455/417; 370/328; 370/338; 370/401
(58) Field of Classification Search ............ 455/422.1, 455/69, 68, 70, 41.2, 411, 414.1, 417; 713/190, 713/153, 170, 184; 709/229, 235; 370/328, 370/338, 401
See application file for complete search history.

(56) References Cited

U.S. PATENT DOCUMENTS

| 6,771,618 B1 | 8/2004 | Ueda |
| 6,907,470 B2 | 6/2005 | Sawada et al. |
| 2002/0035699 A1* | 3/2002 | Crosbie ....................... 713/201 |

FOREIGN PATENT DOCUMENTS

| EP | 1 061 694 A2 | 12/2000 |
| JP | 2000-358059 A | 12/2000 |
| JP | 2001-024706 A | 1/2001 |
| JP | 2002-084306 A | 3/2002 |
| WO | WO98/02004 | 1/1998 |
| WO | WO 00/46963 | 8/2000 |

OTHER PUBLICATIONS

Kerry et al., "Popular Wireless Local Area Networks Gain Large Boost In Speed", *IEEE*, Jun. 23, 2003, <http://standards.ieee.org/announcements/80211gfinal.html>.

* cited by examiner

*Primary Examiner*—Nay Maung
*Assistant Examiner*—Dominic E. Rego
(74) *Attorney, Agent, or Firm*—Foley & Lardner LLP (57) ABSTRACT

A newly developed IP layer technology can be applied to a wireless access network without a wireless base station adding or amending the new IP layer technology to a wireless region specific signal. The wireless base station transfers to a wireless access gateway a communications establishment request signal from a mobile terminal without conversion. When the mobile terminal which is the source of the communications establishment request signal is not permitted to communicate with equipment external to the wireless access network, the wireless access gateway transfers the communications establishment request signal to an access network control station. The access network control station continues communications with the mobile terminal, determines whether or not the communications between the mobile terminal and equipment external to the wireless access network is to be permitted based on the communications between the access network control station and the mobile terminal. When the communications between the mobile terminal and the equipment external to the wireless access network is permitted, it transmits a communications establishment permission signal to instruct the wireless access gateway to establish a channel between the mobile terminal and the equipment external to the wireless access network.

13 Claims, 6 Drawing Sheets

WIRELESS ACCESS CONTROL METHOD AND WIRELESS ACCESS SYSTEM

BACKGROUND OF THE INVENTION

1. Field of the Invention

The present invention relates to a wireless access control method and a wireless access system.

2. Description of the Related Art

In recent years, as the Internet has become widespread, a wireless access system for access from a mobile terminal to the Internet has been contemplated.

A conventional wireless access system is described below. Among other wireless access systems, a wireless LAN system using a wireless LAN (local area network) as a wireless transmission line is described herein.

Figure 5:
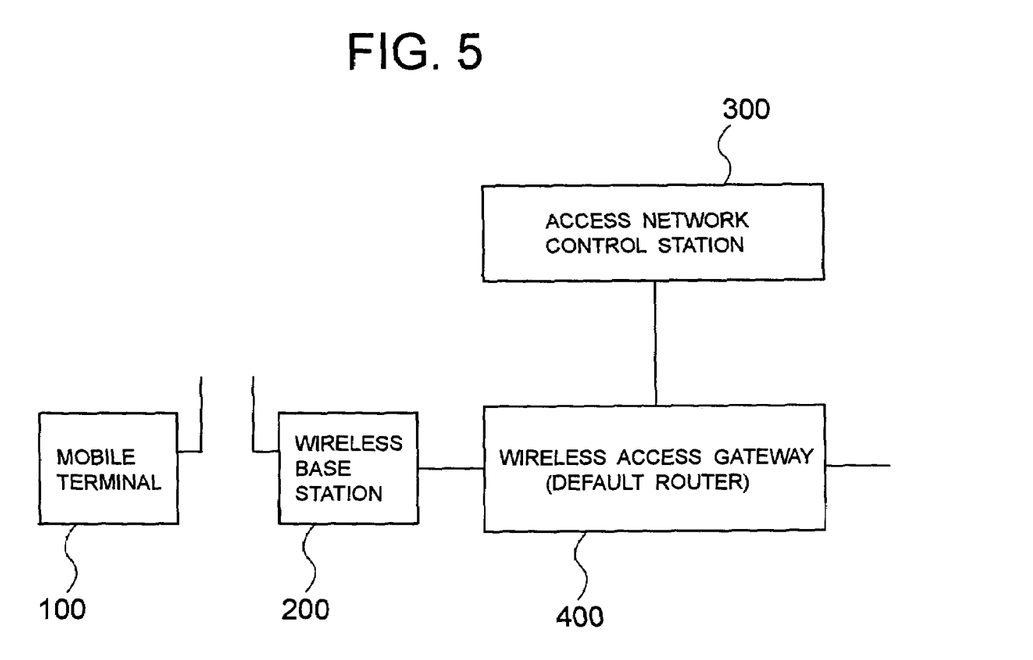
FIG. 5 is a block diagram of the conventional wireless access system.

By referring to FIG. 5, the wireless LAN system according to the conventional technology includes a mobile terminal 100, a wireless base station 200 for communicating with the mobile terminal 100 through a wireless line, an access network control station 300 for controlling the communications with the mobile terminal 100 through a wireless access network, and a wireless access gateway (default router) 400 for establishing a channel between the mobile terminal 100 and equipment external to the wireless access network.

Figure 6:
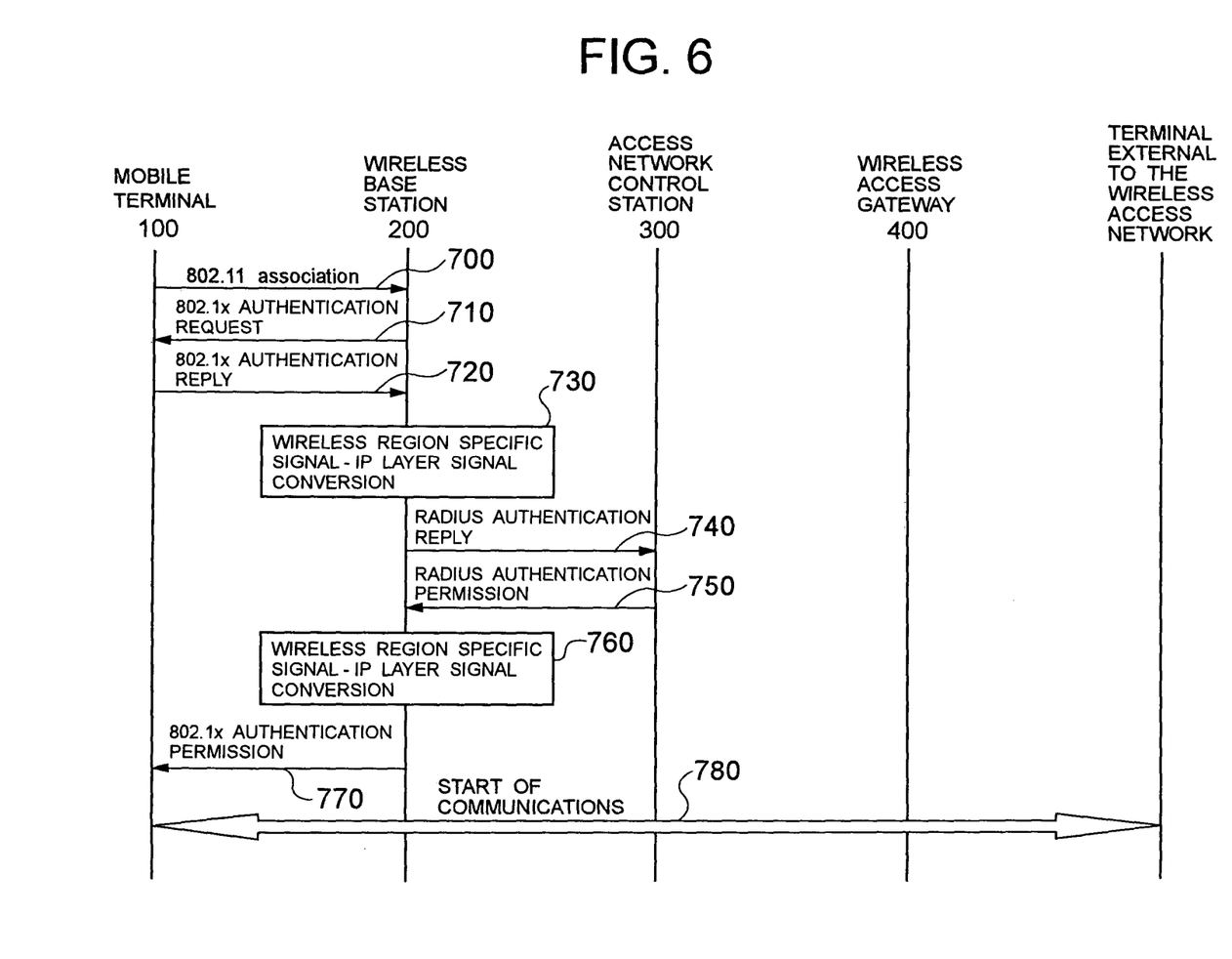
FIG. 6 is a flowchart of the operation of the wireless access system shown in FIG. 5.

The operation performed as an operation of the conventional wireless LAN system shown in FIG. 5 when the communications is performed from the mobile terminal 100 to equipment external to the wireless access network is described below by referring to a flowchart shown in FIG. 6.

A wireless transmission line (802.11 association) in the wireless LAN is established between the mobile terminal 100 and the wireless base station 200 (step 700). "802.11" refers to a standard of a wireless LAN standardized by the IEEE 802 Committee, and 2.4 GHz band DS (direct spread), FH (frequency hopping) system, etc. is prescribed.

Then, the wireless base station 200 transmits an 802.1X authentication request signal for authenticating access by the mobile terminal 100 (step 710). In this example, "802.1X" refers to a standard of an authentication protocol standardized by the IEEE 802 Committee, and is used in user authentication, etc. during logging in a wireless LAN.

The mobile terminal 100 returns to the wireless base station 200 an 802.1X authentication reply signal corresponding to an 802.1X authentication request signal received from the wireless base station 200 (step 720).

The wireless base station 200 converts the 802.1X authentication reply signal which is a wireless region specific signal received from the mobile terminal 100 into a RADIUS authentication signal which is an IP (Internet protocol) layer signal (step 730), and transmits the converted RADIUS authentication signal as a RADIUS authentication reply signal to the access network control station 300 (step 740). "RADIUS" refers to the standard (RFC 2138) of the user authentication system standardized by the IETF, and is used when access is permitted or rejected, etc. according to user information.

The access network control station 300 determines whether or not access by the mobile terminal 100 is permitted according to the RADIUS authentication reply signal received from the wireless base station 200. When access is permitted, a RADIUS authentication permission signal is transmitted to the wireless base station 200 (step 750).

The wireless base station 200 converts a RADIUS authentication permission signal which is an IP layer signal into an 802.1X authentication permission signal which is a wireless specific signal (step 760), and the converted 802.1X authentication permission signal is transmitted to the mobile terminal 100 (step 770).

Then, the mobile terminal 100 starts communications with a terminal external to the wireless access network (step 780).

As described above, in access control shown in FIG. 6 the conventional wireless access system realizes access control to equipment external to the wireless access network by converting a wireless region specific signal into an IP layer signal by the wireless base station. On the other hand, the technology of the IP layer has been advanced through the standardization by the IETF, etc., and technologies of authentication, accounting, QoS (Quality of Service) control, etc. have been newly developed.

In the conventional wireless access system, the IP layer technology can be applied to a wireless access network if a new IP layer technology is added or amended to a wireless region specific signal in the processes in steps 700 to 720 in the wireless base station.

However, after completing the access control process, the processes in steps 700 to 720 are not performed. Therefore, unless a new IP layer technology is added or amended to the wireless region specific signal before completing the access control process in the wireless base station, all IP packets received and put in packets by the wireless base station are transmitted outside the wireless access network without applying a new IP layer technology.

The present invention aims at providing a wireless access control method and a wireless access system in which a new IP layer technology can be applied to a wireless access network without a wireless base station adding or amending the new IP layer technology to a wireless region specific signal.

SUMMARY OF THE INVENTION

To attain the above-mentioned object, the wireless access control method according to the present invention uses a mobile terminal, a wireless base station for communications with the mobile terminal through a wireless channel, an access network control station for control of a wireless access network by communications with the mobile terminal, and a wireless access gateway for establishing a channel between the mobile terminal and the equipment external to the wireless access network. With the above-mentioned configuration, the method includes the steps of: the mobile terminal transmitting to the wireless base station a wireless control signal to be transmitted to equipment external to the wireless access network; the wireless base station transferring the wireless control signal to the wireless access gateway without converting the signal; when the wireless control signal is transferred from the wireless access gateway, the access network control station communicating with the mobile terminal through the wireless base station, and determining whether or not communications with equipment external to the wireless access network of the mobile terminal is allowed based on the communications between the station and the mobile terminal; when the access network control station allows the communications of the mobile terminal with the equipment external to the wireless access network, the access network control station instructing the wireless access gateway to establish a channel between the mobile terminal and the wireless access network; and upon receipt of the instruction from the access network control station to establish a channel between the mobile terminal and the equipment external to the wireless access network, the wireless access gateway establishing the channel between the mobile terminal and the equipment external to the wireless access network, and transmitting the wireless control signal to the equipment external to the wireless access network.

With the above-mentioned configuration, the access network control station can apply a new IP layer technology to a wireless access network during communications with a mobile terminal. Therefore, it is not necessary for the wireless base station to add or amend the new IP layer to a wireless region specific signal.

The method can also be designed such that, when the wireless access gateway establishes a channel between the mobile terminal and the equipment external to the wireless access network, the wireless access gateway can instruct the wireless base station to establish a dedicated channel between the mobile terminal and the wireless access gateway in a wireless region.

The method can also be designed such that, when the wireless control signal is transferred from the wireless base station, and when the wireless access gateway determines that a source of the wireless control signal is not allowed to communicate with equipment external to the wireless access network, the wireless access gateway can change the destination of the wireless control signal to the access network control station, and transfer the wireless control signal to the access network control station.

The method can also be designed such that, when the wireless control signal is transferred from the wireless base station, and when the wireless access gateway determines that a source of the wireless control signal is allowed to communicate with equipment external to the wireless access network, the wireless access gateway does not change the destination of the wireless control signal to the access network control station, but establishes a channel between the mobile terminal and equipment external to the wireless access network, and transmits the wireless control signal to the equipment external to the wireless access network.

The method can also be designed such that, when the wireless control signal is transferred from the wireless base station, and when the wireless access gateway determines that a shared control channel different from the dedicated channel is used in communications of the wireless control signal, the wireless access gateway can change the destination of the wireless control signal into the access network control station, and transfer the wireless control signal into the access network control station.

The method can also be designed such that, when the wireless control signal is transferred from the wireless base station, and when the wireless access gateway determines that the dedicated channel is used in communications of the wireless control signal, the wireless access gateway does not change the destination of the wireless control signal into the access network control station, but establishes a channel between the mobile terminal and equipment external to the wireless access network, and transmits the wireless control signal to the equipment external to the wireless access network.

To attain the above-mentioned object, the a wireless access system according to the present invention includes: a mobile terminal for transmitting a wireless control signal to be transmitted to equipment external to the wireless access network; a wireless base station for transferring the wireless control signal from the mobile terminal without conversion; a wireless access gateway for further transferring the wireless control signal when the wireless control signal is transferred from the wireless base station, and when it is determined that a source of the wireless control signal is not allowed to communicate with equipment external to the wireless access network; and an access network control station for instructing the wireless access gateway to establish a channel between the mobile terminal and equipment external to the wireless access network when communications are performed with the mobile terminal through the wireless base station when the wireless control signal is transferred from the wireless access gateway, and when communications between the mobile terminal and equipment external to the wireless access network is allowed based on the communications performed with the mobile terminal. With the above-mentioned configuration, when the wireless access gateway is instructed to establish a channel between the mobile terminal and equipment external to the wireless access network by the access network control station, the wireless access gateway establishes a channel between the mobile terminal and the equipment external to the wireless access network, and transmits the wireless control signal to the equipment external to the wireless access network.

To attain the above-mentioned object, another aspect of the wireless access system according to the present invention includes: a mobile terminal for transmitting a wireless control signal to be transmitted to equipment external to the wireless access network; a wireless base station for transferring the wireless control signal from the mobile terminal without conversion; a wireless access gateway for further transferring the wireless control signal depending on a channel used in communications of the wireless control signal when the wireless control signal is transferred from the wireless base station; and an access network control station for instructing the wireless access gateway to establish a channel between the mobile terminal and equipment external to the wireless access network when communications are performed with the mobile terminal through the wireless base station when the wireless control signal is transferred from the wireless access gateway, and when communications between the mobile terminal and equipment external to the wireless access network is allowed based on the communications performed with the mobile terminal. With the above-mentioned configuration, when the wireless access gateway is instructed to establish a channel between the mobile terminal and equipment external to the wireless access network by the access network control station, the wireless access gateway establishes a channel between the mobile terminal and the equipment external to the wireless access network, and transmits the wireless control signal to the equipment external to the wireless access network.

DETAILED DESCRIPTION OF THE PREFERRED EMBODIMENTS

The embodiments of the present invention are described below by referring to the attached drawings.

First Embodiment

Figure 1:
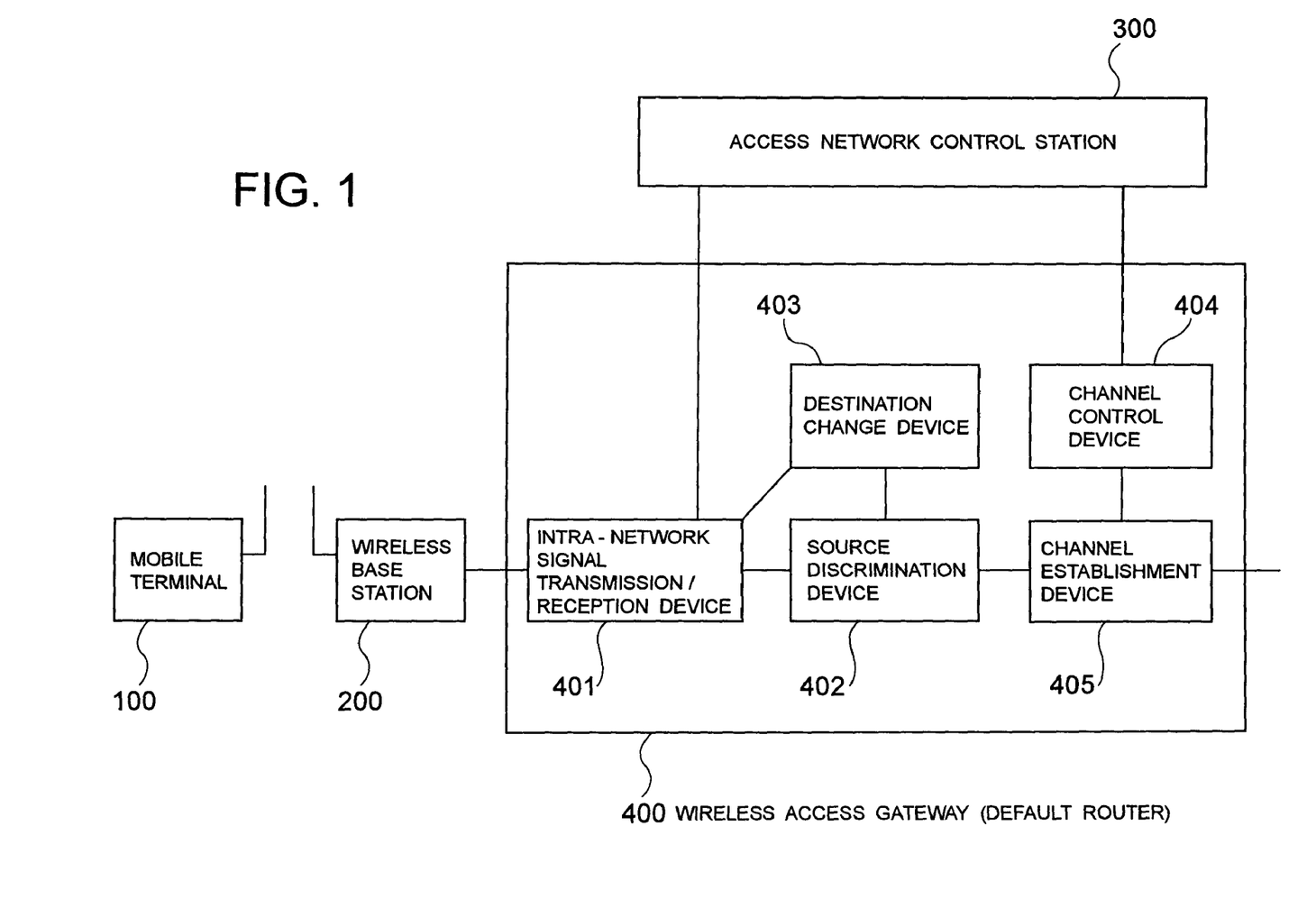
FIG. 1 is a block diagram of a wireless access system according to the first embodiment of the present invention.

FIG. 1 is a block diagram of the wireless access system according to the first embodiment of the present invention.

As shown in FIG. 1, the wireless access system according to the first embodiment of the present invention comprises the mobile terminal 100, the wireless base station 200 for communications with the mobile terminal 100 through a wireless circuit, the access network control station 300 for control of the communications between the mobile terminal 100 and a wireless access network, and the wireless access gateway 400 (default router) for establishing a channel between the mobile terminal 100 and equipment external to the wireless access network.

The wireless access gateway 400 comprises an intra-network signal transmission/reception device 401, a source discrimination device 402, a destination change device 403, a channel control device 404, and a channel establishment device 405.

The intra-network signal transmission/reception device 401 transmits/receives a signal between the wireless base station 200 and the access network control station 300 in the wireless access network.

The source discrimination device 402 determines whether or not the source of the wireless control signal received by the intra-network signal transmission/reception device 401 is permitted to communicate with equipment external to the wireless access network.

When the source discrimination device 402 determines that the source of the wireless control signal is not permitted to communicate with equipment external to the wireless access network, the destination change device 403 changes the destination of the wireless control signal received by the intra-network signal transmission/reception device 401 into the access network control station 300.

When the access network control station 300 permits the communications between the mobile terminal 100 and equipment external to the wireless access network, the channel control device 404 controls the establishment of a channel between the mobile terminal 100 and the equipment external to the wireless access network.

The channel establishment device 405 establishes a channel between the mobile terminal 100 and the equipment external to the wireless access network under control of the channel control device 404.

Figure 2:
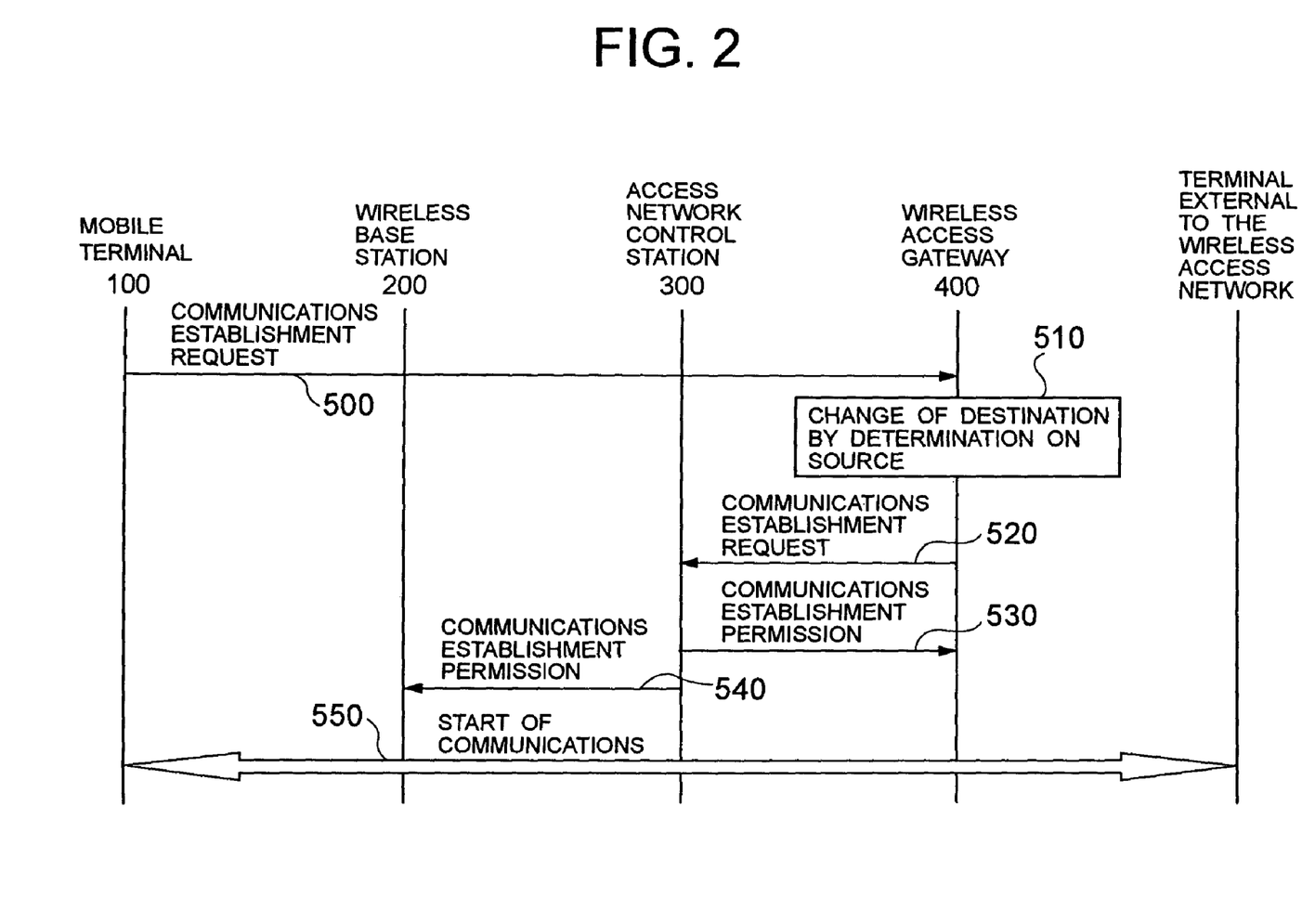
FIG. 2 is a flowchart of the operations of the wireless access system shown in FIG. 1.

The operations performed by the wireless access system shown in FIG. 1 in the communications from the mobile terminal 100 to a terminal external to the wireless access network are described below by referring to a flowchart shown in FIG. 2.

First, the mobile terminal 100 transmits a communications establishment request signal which is a wireless control signal to the wireless base station 200, and the wireless base station 200 transfers the communications establishment request signal to the wireless access gateway 400 without conversion (step 500).

In the wireless access gateway 400, the intra-network signal transmission/reception device 401 receives the communications establishment request signal from the mobile terminal 100, and the source discrimination device 402 determines whether or not the source of the communications establishment request signal, that is, the mobile terminal 100, is permitted to communicate with equipment external to the wireless access network. If the mobile terminal 100 is not permitted to communicate with equipment external to the wireless access network, the destination change device 403 changes the destination of the communications establishment request signal into the access network control station 300 (step 510), and the intra-network signal transmission/reception device 401 transfers the communications establishment request signal to the access network control station 300 (step 520).

Then, access network control station 300 continues through the wireless base station 200 the communications with the mobile terminal 100 which is the source of the communications establishment signal transferred from the wireless access gateway 400. In the communications, if a new IP layer technology has been developed, the IP layer technology is applied to the wireless access network.

Then, the access network control station 300 determines whether or not the mobile terminal 100 is to be permitted to communicate with equipment external to the wireless access network based on the communications with the mobile terminal 100. If the communications with the equipment external to the wireless access network is to be permitted, then the access network control station 300 transmits a communications establishment permission signal to the wireless access gateway 400 (step 530).

In the wireless access gateway 400, the channel control device 404 receives a communications establishment permission signal from the access network control station 300, and instructs the channel establishment device 405 to establish a channel between the mobile terminal 100 and equipment external to the wireless access network. Then, the channel establishment device 405 establishes a channel between the mobile terminal 100 and equipment external to the wireless access network, and transmits an IP packet containing the communications establishment request signal from the mobile terminal 100 to a terminal external to the wireless access network. Furthermore, the channel control device 404 transmits to the wireless base station 200 a communications establishment permission signal for permission of the communications between the mobile terminal 100 and equipment external to the wireless access network (step 540), and issues an instruction to establish a dedicated channel between the mobile terminal 100 and the wireless access gateway 400 in a wireless region.

Then, the wireless base station 200 establishes a dedicated channel between the mobile terminal 100 and the wireless access gateway 400 in a wireless region. Thereafter, the mobile terminal 100 can communicate with a terminal external to the wireless access network through the dedicated channel (step 550).

If the wireless access gateway 400 determines when a communications establishment request signal is transferred in step 500 that the source of the communications establishment request signal, that is, the mobile terminal 100, is permitted to communicate with equipment external to the wireless access network, then it establishes a channel between the mobile terminal 100 and the equipment external to the wireless access network without changing the destination of the communications establishment request signal into the access network control station 300, and transmits to a terminal external to the wireless access network an IP packet containing the communications establishment request signal from the mobile terminal 100.

Second Embodiment

Figure 3:
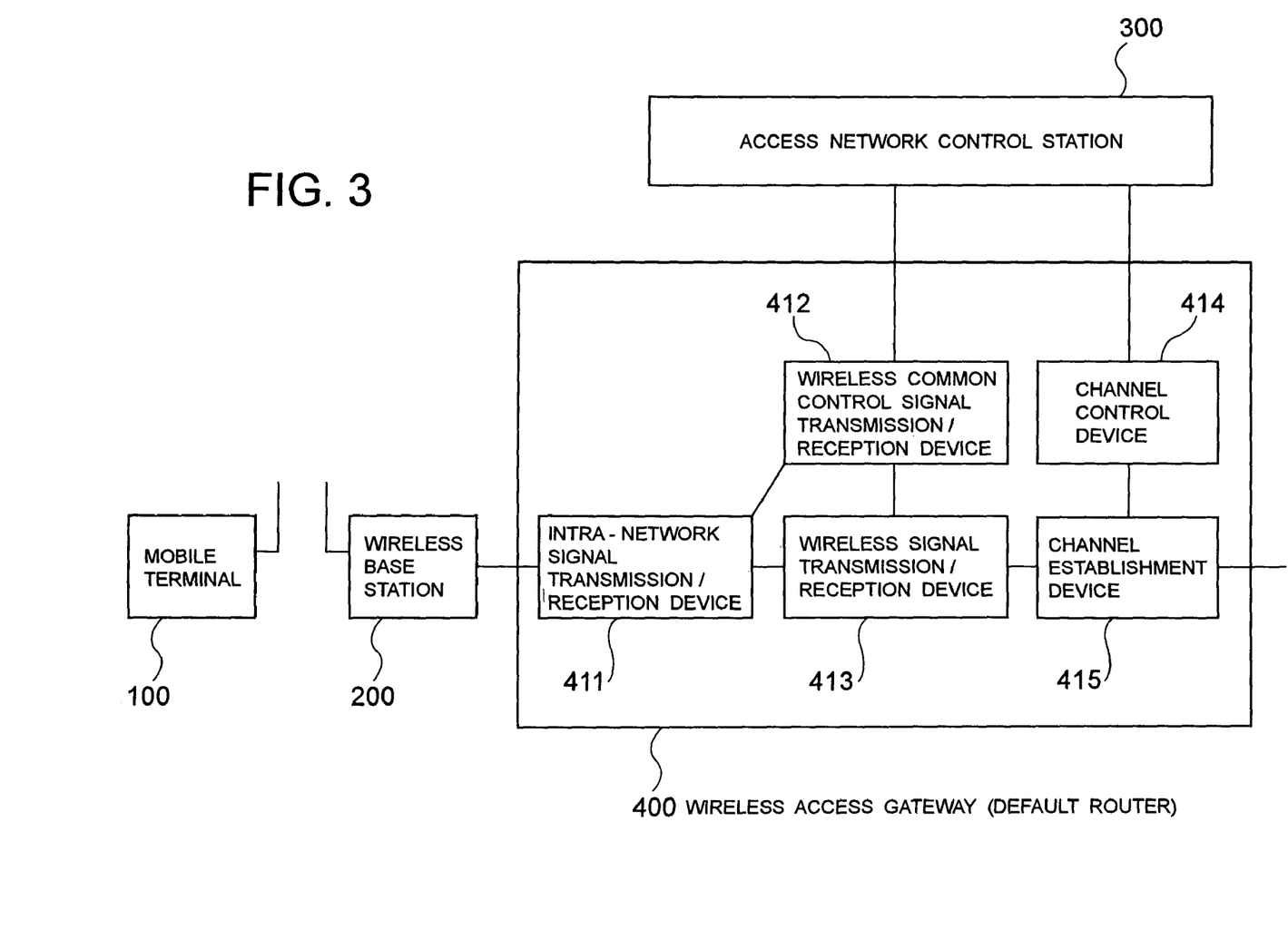
FIG. 3 is a block diagram of a wireless access system according to the second embodiment of the present invention.

FIG. 3 is a block diagram of the wireless access system according to the second embodiment of the present invention.

As shown in FIG. 3, the wireless access gateway 400 in the wireless access system according to the second embodiment of the present invention comprises an intra-network signal transmission/reception device 411, a wireless common control signal transmission/reception device 412, a wireless signal transmission/reception device 413, a channel control device 414, and a channel establishment device 415.

The intra-network signal transmission/reception device 411 transmits/receives a signal between the wireless base station 200 and the access network control station 300 in a wireless access network.

The wireless common control signal transmission/reception device 412 transmits/receives through the intra-network signal transmission/reception device 411 a wireless common control signal to be communicated through a shared control channel in a wireless region. The shared control channel is used by the mobile terminal 100 not permitted to communicate with equipment external to the wireless access network in communicating a wireless common control signal.

When the wireless common control signal transmission/reception device 412 receives a wireless common control signal from the mobile terminal 100, it changes the destination of the wireless common control signal into the access network control station 300, and transfers the wireless common control signal to the access network control station 300.

The wireless signal transmission/reception device 413 transmits/receives through the intra-network signal transmission/reception device 411 a wireless control signal communicated through a dedicated channel in a wireless region. The dedicated channel is used by the mobile terminal 100 permitted to communicate with equipment external to the wireless access network in communicating a wireless common control signal.

When the access network control station 300 permits the communications between the mobile terminal 100 and equipment external to the wireless access network, the channel control device 414 controls the establishment of a channel between the mobile terminal 100 and the equipment external to the wireless access network.

The channel establishment device 415 establishes a channel between the mobile terminal 100 and equipment external to the wireless access network under control of the channel control device 414.

Figure 4:
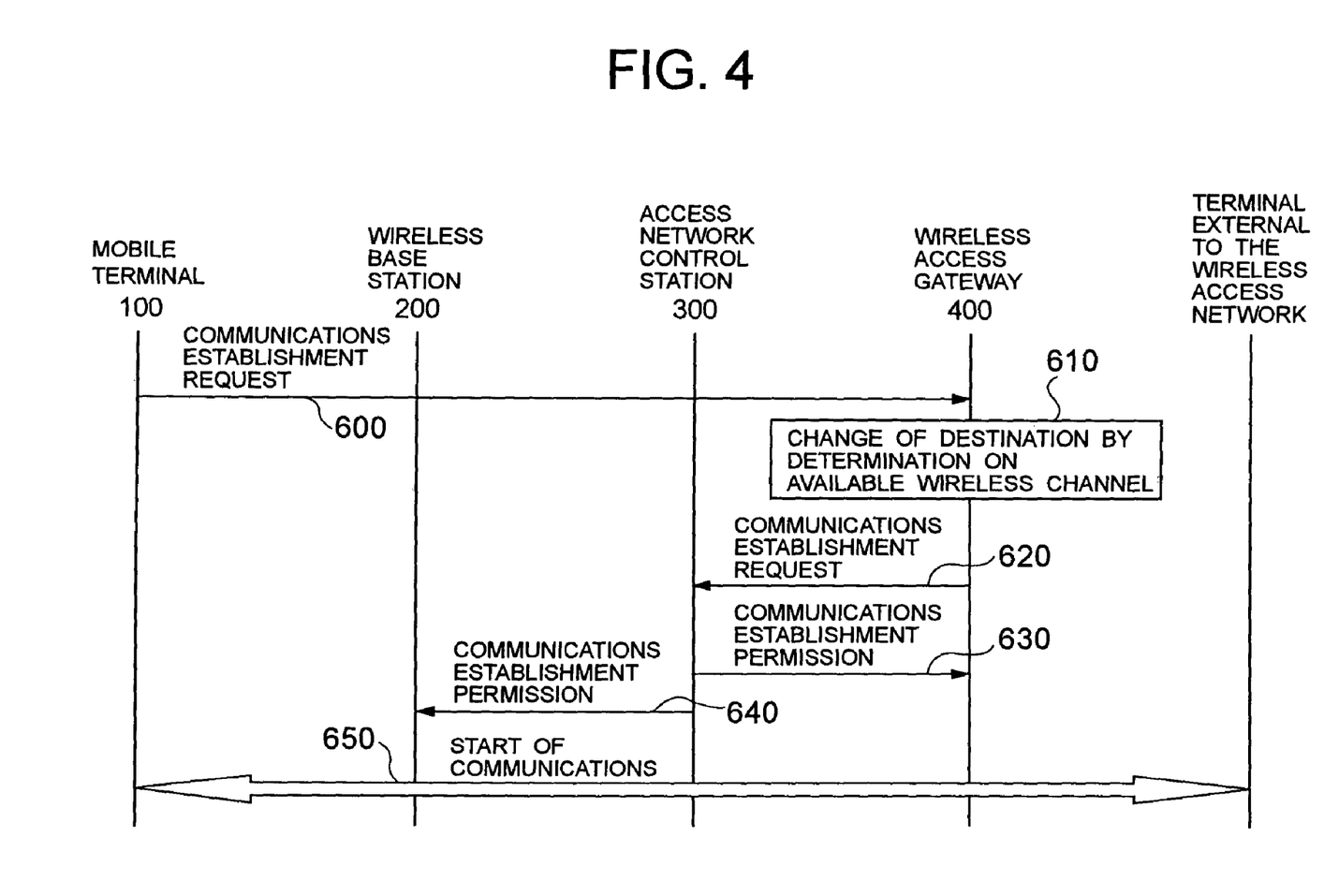
FIG. 4 is a flowchart of the operations of the wireless access system shown in FIG. 3.

The operations performed by the wireless access system shown in FIG. 3 in the communications from the mobile terminal 100 to a terminal external to the wireless access network are described below by referring to a flowchart shown in FIG. 4.

First, the mobile terminal 100 transmits a communications establishment request signal which is a wireless control signal to the wireless base station 200, and the wireless base station 200 transfers the communications establishment request signal to the wireless access gateway 400 without conversion (step 600).

In the wireless access gateway 400, the communications establishment request signal from the mobile terminal 100 is received by the wireless common control signal transmission/reception device 412 or the wireless signal transmission/reception device 413 through the intra-network signal transmission/reception device 411. When a communications establishment request signal from the mobile terminal 100 is received by the wireless common control signal transmission/reception device 412, the wireless common control signal transmission/reception device 412 changes the destination of the communications establishment request signal into the access network control station 300 (step 610), and transfers the communications establishment request signal to the access network control station 300 (step 620).

Then, the access network control station 300 continues communications through the wireless base station 200 with the mobile terminal 100 which is the source of the communications establishment signal transferred from the wireless access gateway 400. In the communications, if a new IP layer technology has been developed, the IP layer technology is applied to a wireless access network.

Then, the access network control station 300 determines whether or not the communications between the mobile terminal 100 and equipment external to the wireless access network can be permitted based on the communications with the mobile terminal 100. When the communications with equipment external to the wireless access network are permitted, the access network control station 300 transmits a communications establishment permission signal to the wireless access gateway 400 (step 630).

In the wireless access gateway 400, the channel control device 414 receives a communications establishment permission signal from the access network control station 300, and instructs the channel establishment device 415 to establish a channel between the mobile terminal 100 and equipment external to the wireless access network. Then, the channel establishment device 415 establishes a channel between the mobile terminal 100 and equipment external to the wireless access network, and transmits an IP packet containing the communications establishment request signal from the mobile terminal 100 to a terminal external to the wireless access network. Furthermore, the channel control device 414 transmits to the wireless base station 200 a communications establishment permission signal for permission of communications between the mobile terminal 100 and equipment external to the wireless access network (step 640), and issues an instruction to establish a dedicated channel between the mobile terminal 100 and the wireless access gateway 400 in a wireless region.

Then, the wireless base station 200 establishes a dedicated channel between the mobile terminal 100 and the wireless access gateway 400 in a wireless region. Afterwards, the mobile terminal 100 can communicate through the dedicated channel with a terminal external to the wireless access network (step 650).

When a communications establishment request signal is transferred in step 600, and the communications establishment request signal is received by the wireless control signal transmission/reception device 413, the wireless access gateway 400 establishes a channel between the mobile terminal 100 and equipment external to the wireless access network without changing the destination of the communications establishment request signal into the access network control station 300, and transmits to a terminal external to the wireless access network an IP packet containing the communications establishment request signal from the mobile terminal 100.

As describe above, in the present invention, a wireless base station transfers a wireless control signal from a mobile terminal to a wireless access gateway without conversion, and the wireless access gateway transfers the wireless control signal to an access network control station corresponding to a channel used in the communications of the wireless control signal or by the source of the wireless control signal.

Then, the access network control station determines whether or not the communications between a mobile terminal and equipment external to the wireless access network can be permitted by the communications with the mobile terminal through the wireless base station. If the communications with the equipment external to the wireless access network is permitted, an instruction is issued to the wireless access gateway to establish a channel between the mobile terminal and equipment external to the wireless access network.

Thus, since a new IP layer technology such as authentication, accounting, QoS control, etc. can be forcibly applied to a wireless access network in the communications with a mobile terminal in the access network control station, it is not necessary for a number of wireless base stations to add or amend the new IP layer technology to a wireless region specific signal.

What is claimed is:

1. A wireless access system, comprising:
   a gateway for receiving a wireless control signal, a destination of the wireless control signal corresponding to external equipment located beyond the gateway such that the wireless control signal is to be transmitted to the external equipment located beyond the gateway;
   a wireless base station for transferring the wireless control signal to the gateway;
   a mobile terminal for transmitting the wireless control signal to the wireless base station; and
   an access network control station for determining whether or not the mobile terminal is allowed to communicate with the external equipment;
   wherein the gateway is configured to change the destination of the wireless control signal so as to transfer the wireless control signal to the access network control station in a case where the gateway has determined that the mobile terminal has not been allowed to communicate with the external equipment by the access network control station;
   wherein the access network control station is configured to instruct the gateway to allow the mobile terminal to communicate with the external equipment in a case where the access network control station has determined that the mobile terminal is allowed to communicate with the external equipment; and
   wherein the gateway is configured to transfer the wireless control signal to the external equipment in accordance with the destination of the wireless control signal in a case where the gateway has determined that the mobile terminal has been allowed to communicate with the external equipment by the access network control station.

2. The wireless access system according to claim 1, wherein the access network control station is configured to determine whether or not the mobile terminal is allowed to communicate with the external equipment based on communications with the mobile terminal through the wireless base station.

3. The wireless access system according to claim 1, wherein the gateway is configured to instruct the wireless base station to establish a dedicated channel between the mobile terminal and the gateway to transfer the wireless control signal to the external equipment after the access network control station instructs the gateway to allow the mobile terminal to communicate with the external equipment.

4. The wireless access system according to claim 3, wherein the gateway is configured to determine whether or not the mobile terminal has been allowed to communicate with the external equipment by the access network control station based on a communication channel used for the wireless control signal.

5. A wireless access system, comprising:
   a gateway for receiving a wireless control signal to be transmitted to external equipment located beyond the gateway;
   a wireless base station for transferring the wireless control signal to the gateway;
   a mobile terminal for transmitting the wireless control signal to the wireless base station; and
   an access network control station for determining whether or not the mobile terminal is allowed to communicate with the external equipment;
   wherein the gateway is configured to transfer the wireless control signal to the access network control station in a case where the gateway has determined that the mobile terminal has not been allowed to communicate with the external equipment by the access network control station;
   wherein the access network control station is configured to instruct the gateway to allow the mobile terminal to communicate with the external equipment in a case where the access network control station has determined that the mobile terminal is allowed to communicate with the external equipment;
   wherein the gateway is configured to transfer the wireless control signal to the external equipment in a case where the gateway has determined that the mobile terminal has been allowed to communicate with the external equipment by the access network control station;
   wherein the gateway is configured to instruct the wireless base station to establish a dedicated channel between the mobile terminal and the gateway to transfer the wireless control signal to the external equipment after the access network control station instructs the gateway to allow the mobile terminal to communicate with the external equipment;
   wherein the gateway is configured to determine whether or not the mobile terminal has been allowed to communicate with the external equipment by the access network control station based on a communication channel used for the wireless control signal; and
   wherein the gateway is configured to determine that the mobile terminal has not been allowed to communicate with the external equipment by the access network control station in a case where the communication channel used for the wireless control signal is not the dedicated channel.

6. The wireless access system according to claim 5, wherein the gateway is configured to determine that the mobile terminal has been allowed to communicate with the external equipment by the access network control station in a case where the communication channel used for the wireless control signal is the dedicated channel.

7. A wireless access control method used in a wireless access system, said wireless access system including a mobile terminal, a wireless base station, a gateway, and an access network control station, said method comprising:
   transmitting, from the mobile terminal to the wireless base station, a wireless control signal having a destination corresponding to external equipment located beyond the gateway such that the wireless control signal is to be transmitted to the external equipment located beyond the gateway;

transferring the wireless control signal from the wireless base station to the gateway;

changing, by the gateway, the destination of the wireless control signal such that the destination of the wireless control signal is made to be the access network control station in a case where the gateway has determined that the mobile terminal has not been allowed to communicate with the external equipment by the access network control station;

transferring, from the gateway to the access network control station, the wireless control signal in a case where the gateway has changed the destination of the wireless control signal to be the access network control station;

instructing, by the access network control station, the gateway to allow the mobile terminal to communicate with the external equipment in a case where the access network control station has determined that the mobile terminal is allowed to communicate with the external equipment; and transferring, by the gateway, the wireless control signal to the external equipment in accordance with the destination of the wireless control signal in a case where the gateway has determined that the mobile terminal has been allowed to communicate with the external equipment by the access network control station.

8. The wireless access control method according to claim 7, wherein the mobile terminal is allowed to communicate with the external equipment based on communications between the access network control station and the mobile terminal through the wireless base station.

9. The wireless access control method according to claim 7, further comprising:

instructing, by the gateway, the wireless base station to establish a dedicated channel between the mobile terminal and the gateway to transfer the wireless control signal to the external equipment after the access network control station instructs the gateway to allow the mobile terminal to communicate with the external equipment.

10. The wireless access control method according to claim 9, wherein the gateway determines whether or not the mobile terminal has been allowed to communicate with the external equipment by the access network control station based on a communication channel used for the wireless control signal.

11. A wireless access control method used in a wireless access system, said wireless access system including a mobile terminal, a wireless base station, a gateway, and an access network control station, said method comprising:

transmitting, from the mobile terminal to the wireless base station, a wireless control signal to be transmitted to external equipment located beyond the gateway;

transferring the wireless control signal from the wireless base station to the gateway;

transferring, from the gateway to the access network control station, the wireless control signal in a case where the gateway has determined that the mobile terminal has not been allowed to communicate with the external equipment by the access network control station;

instructing, by the access network control station, the gateway to allow the mobile terminal to communicate with the external equipment in a case where the access network control station has determined that the mobile terminal is allowed to communicate with the external equipment;

transferring, by the gateway, the wireless control signal to the external equipment in a case where the gateway has determined that the mobile terminal has been allowed to communicate with the external equipment by the access network control station; and instructing, by the gateway, the wireless base station to establish a dedicated channel between the mobile terminal and the gateway to transfer the wireless control signal to the external equipment after the access network control station instructs the gateway to allow the mobile terminal to communicate with the external equipment;

wherein the gateway determines whether or not the mobile terminal has been allowed to communicate with the external equipment by the access network control station based on a communication channel used for the wireless control signal; and wherein the gateway determines that the mobile terminal has not been allowed to communicate with the external equipment by the access network control station in a case where the communication channel used for the wireless control signal is not the dedicated channel.

12. The wireless access system according to claim 11, wherein the gateway determines that the mobile terminal has been allowed to communicate with the external equipment by the access network control station in a case where the communication channel used for the wireless control signal is the dedicated channel.

13. A wireless access control method used in a gateway, said method comprising:

receiving a wireless control signal from a mobile terminal through a wireless base station, the wireless control signal having a destination corresponding to external equipment located beyond the gateway such that the wireless control signal is to be transmitted to the external equipment located beyond the gateway;

changing the destination of the wireless control signal such that the destination of the wireless control signal is made to be an access network control station in a case where the gateway has determined that the mobile terminal has not been allowed to communicate with the external equipment by the access network control station;

transferring the wireless control signal to the access network control station in a case where the gateway has changed the destination of the wireless control signal to be the access network control station; and transferring the wireless control signal to the external equipment in accordance with the destination of the wireless control signal in a case where the gateway has determined that the mobile terminal has been allowed to communicate with the external equipment by the access network control station.

* * * * *